(12) United States Patent
Wang et al.

(10) Patent No.: US 11,113,743 B2
(45) Date of Patent: *Sep. 7, 2021

(54) INFORMATION RECOMMENDATION BASED ON RULE MATCHING

(71) Applicant: Advanced New Technologies Co., Ltd., Grand Cayman (KY)

(72) Inventors: Xingchi Wang, Hangzhou (CN); Guoqing Gao, Hangzhou (CN)

(73) Assignee: Advanced New Technologies Co., Ltd., Grand Cayman (KY)

( * ) Notice: Subject to any disclaimer, the term of this patent is extended or adjusted under 35 U.S.C. 154(b) by 0 days.

This patent is subject to a terminal disclaimer.

(21) Appl. No.: 16/722,202

(22) Filed: Dec. 20, 2019

(65) Prior Publication Data

US 2020/0125615 A1 Apr. 23, 2020

Related U.S. Application Data

(63) Continuation of application No. 15/976,560, filed on May 10, 2018, which is a continuation of application No. PCT/CN2016/104492, filed on Nov. 4, 2016.

(30) Foreign Application Priority Data

Nov. 13, 2015 (CN) .......................... 201510780621.0

(51) Int. Cl.
*G06Q 30/00* (2012.01)
*G06Q 30/06* (2012.01)
(Continued)

(52) U.S. Cl.
CPC ....... *G06Q 30/0631* (2013.01); *G06F 40/205* (2020.01); *G06Q 30/0251* (2013.01);
(Continued)

(58) Field of Classification Search
CPC .......... G06Q 30/0631; G06Q 30/0269; G06Q 50/01; G06Q 30/0251; G06F 40/205; G06F 16/9535; G06F 16/00; H04L 51/04
See application file for complete search history.

(56) References Cited

U.S. PATENT DOCUMENTS

2012/0059821 A1* 3/2012 Li ........................ G06F 16/334
707/728
2012/0226678 A1 9/2012 Park et al.
(Continued)

FOREIGN PATENT DOCUMENTS

CN 101030283 9/2007
CN 101034455 9/2007
(Continued)

OTHER PUBLICATIONS

Context-based Multimedia Content Management Framework and Its Location-aware Web Applications. (Year: 2010).*
(Continued)

*Primary Examiner* — Maria V Vanderhorst
(74) *Attorney, Agent, or Firm* — Fish & Richardson P.C.

(57) ABSTRACT

Text data transmitted by a user device to a first server is retrieved. The text data is processed to determine whether an information recommendation rule set includes an information recommendation rule matching the text data. The information recommendation rule is set based on a recommendation information. If the information recommendation rule set includes the information recommendation rule matching the text data, the recommendation information is retrieved from a second server. A recommendation based on the recommendation information is transmitted to the user device.

19 Claims, 5 Drawing Sheets

(51) Int. Cl.
  *G06Q 30/02* (2012.01)
  *G06F 40/205* (2020.01)
  *G06Q 50/00* (2012.01)
  *G05B 19/418* (2006.01)
  *H04L 12/58* (2006.01)

(52) U.S. Cl.
  CPC ......... *G06Q 30/0269* (2013.01); *G06Q 50/01* (2013.01); *H04L 51/04* (2013.01)

(56) References Cited

U.S. PATENT DOCUMENTS

| | | | |
|---|---|---|---|
| 2015/0237152 A1 | 8/2015 | Yue | |
| 2016/0301639 A1* | 10/2016 | Liu | G06Q 50/01 |
| 2018/0260489 A1 | 9/2018 | Wang et al. | |

FOREIGN PATENT DOCUMENTS

| | | |
|---|---|---|
| CN | 101072193 | 11/2007 |
| CN | 101216825 | 7/2008 |
| CN | 102768685 | 11/2012 |
| CN | 102984270 | 3/2013 |
| CN | 103136300 | 6/2013 |
| CN | 103176982 | 6/2013 |
| CN | 103970857 | 8/2014 |
| CN | 104022940 | 9/2014 |
| CN | 104123360 | 10/2014 |
| CN | 104135498 | 11/2014 |
| CN | 104639420 | 5/2015 |
| CN | 104699696 | 6/2015 |
| JP | 2005190431 | 7/2005 |
| JP | 2010218140 | 9/2010 |
| JP | 2013109629 | 6/2013 |
| JP | 2014075006 | 4/2014 |
| KR | 20150041674 | 4/2015 |
| WO | WO 2014040516 | 3/2014 |
| WO | WO 2015070690 | 5/2015 |
| WO | WO 2015106644 | 7/2015 |

OTHER PUBLICATIONS

Crosby et al., "BlockChain Technology: Beyond Bitcoin," Sutardja Center for Entrepreneurship & Technology Technical Report, Oct. 16, 2015, 35 pages.
Extended European Search Report issued in EP Application No. 16863577.9 dated Jul. 17, 2018; 8 pages.
International Search Report issued by the International Searching Authority in International Application No. PCT/CN2016/104492 dated Feb. 10, 2017; 9 pages.
Nakamoto, "Bitcoin: A Peer-to-Peer Electronic Cash System," www.bitcoin.org, 2005, 9 pages.
PCT International Preliminary Report on Patentability in International Application No. PCT/CN2016/104492, dated May 15, 2018, 9 pages (with English translation).
PCT Written Opinion of the International Searching Authority in International Application No. PCTCN2016104492, dated Feb. 10, 2017, 8 pages (with English translation).
Written Opinion of the Intellectual Property Office of Singapore issued in Singapore Application No. 11201804033R, dated Aug. 27, 2019, 5 pages.
Data Structure and Application Algorithm Tutorial, 1st ed. Qinghua University Press, Feb. 2001, pp. 193-197 (with machine translation).
Artificial Emotion in Interaction Design, 1st ed., Wuhan University Press, Jul. 2015, p. 150 (with machine translation).
C++ Language Concise Tutorial, XiDian University Press, Aug. 2012, pp. 161-162 (with English translation).
Dreamweaver CS3 Chinese Version Example Tutorial, 1st ed, Shanghai Science Popularization Press, Jan. 2009, Chapter 0.1.2 (with English translation).
E-Commerce Recommendation Technology and Its Improvement Mechanism, China Fortune Publishing House, Jun. 2014, pp. 58-60 (with machine translation).
Internet Public Opinion Analysis—Theory, Technology and Strategy, 1st ed, Nation Defense Industry Press, Mar. 2015, p. 316 (with English translation).
Niculescu et al. "Design and evaluation of a conversational agent for the touristic domain," Signal and Information Processing Association Annual Summit and Conference (APSIPA), Dec. 2014, 10 pages.

* cited by examiner

INFORMATION RECOMMENDATION BASED ON RULE MATCHING

This application is a continuation of U.S. application Ser. No. 15/976,560, filed on May 10, 2018, which is a continuation of PCT Application No. PCT/CN2016/104492, filed on Nov. 4, 2016, which claims priority to Chinese Patent Application No. 201510780621.0, filed on Nov. 13, 2015, and each application is hereby incorporated by reference in its entirety.

TECHNICAL FIELD

The present application relates to the field of computer technologies, and in particular, to an information recommendation method and apparatus.

BACKGROUND

With the continuous development of internet technology, people can conduct more and more activities on the internet. It becomes more common to recommend information through the internet.

Generally, when an information recommendation party recommends information, the recommended information usually has certain pertinence. For example, the recommended information can be information that a specific group of people (for example, white-collar workers, students, or females) are likely to appreciate or be interested in.

Currently, in order to have more specific groups of people to obtain recommended information, the information recommendation party usually recommends the information to as many users as possible.

For example, taking the advertisement recommendation on an e-commerce website. Assuming that the e-commerce website expects to push an advertisement for a skirt to female users. Based on the existing technology, to achieve this goal, the e-commerce website will send the advertisement to all users of the website. Because the users of the website are not all female, when the advertisement is pushed, a large amount of resources of the website server are consumed for pushing the advertisement to users that are not female.

It can be seen that, when information is recommended by using the existing technology, many processing resources need to be consumed for recommending information to a specific group of people.

SUMMARY

Implementations of the present application provide an information recommendation method to resolve an existing problem that many processing resources need to be consumed for recommending information to a specific group of people.

The implementations of the present application further provide an information recommendation apparatus to resolve an existing problem that many processing resources need to be consumed for recommending information to a specific group of people.

The following technical solutions are adopted in the implementations of the present application:

The information recommendation method includes: obtaining text data sent by a client to a first server; determining whether a predetermined information recommendation rule set includes an information recommendation rule matching the text data, where the set includes information recommendation rules, and the information recommendation rule is set based on information to be recommended; and if the predetermined information recommendation rule set includes an information recommendation rule matching the text data, obtaining recommendation information matching the matched information rule and provided by a second server.

The information recommendation apparatus includes: a text data acquisition unit, configured to obtain text data sent by a client to a first server; an information recommendation rule determining unit, configured to determine whether a predetermined information recommendation rule set includes an information recommendation rule matching the text data, where the set includes information recommendation rules, and the information recommendation rule is set based on information to be recommended; and a recommendation information acquisition unit, configured to: if the predetermined information recommendation rule set includes an information recommendation rule matching the text data, obtain recommendation information matching the matched information rule and provided by a second server.

The implementations of the present application can use at least one of the foregoing technical solutions to achieve the following beneficial effects.

Based on the information recommendation method provided in the implementations of the present application, "if text data sent by the client matches an information recommendation rule that is based on information to be recommended, it indicates that a user probably belongs to a specific group of people who appreciate or are interested in the recommended information." Only when there is an information recommendation rule matching the text data sent by the client, the information to be recommended provided by the server can be obtained, so that a selective information recommendation can be implemented on the premise that the information is recommended to the specific group of people. As such, the existing problem that many processing resources need to be consumed for recommending the information to the specific group of people can be solved.

BRIEF DESCRIPTION OF DRAWINGS

The accompanying drawings described here are intended to provide a further understanding of the present application, and constitute a part of the present application. The illustrative implementations of the present application and descriptions of the implementations are intended to describe the present application, and do not constitute limitations on the present application. In the accompanying drawings.

DESCRIPTION OF IMPLEMENTATIONS

To make the objectives, technical solutions, and advantages of the present application clearer, the following describes the technical solutions of the present application with reference to specific implementations of the present application and corresponding accompanying drawings. The described implementations are merely some rather than all of the implementations of the present application. Other implementations obtained by a person of ordinary skill in the art based on the implementations of the present application without making creative efforts shall fall within the protection scope of the present application.

The technical solutions provided by the implementations of the present application are described below in detail with reference to the accompanying drawings.

In some implementations of the present application, an information recommendation method is provided to resolve an existing problem that many processing resources need to be consumed for recommending information to a specific group of people.

The information recommendation method provided in this implementation of the present application can be executed by a smartphone, a tablet computer, a personal computer (Personal Computer, PC), a server, or the like. This does not constitute a limitation on the present application. For ease of description, this implementation of the present application is executed by, for example, a client (referred to as an "information recommendation client" below). It can be understood that executing this method by a smartphone is only an example, and should not be considered as a limitation of this method.

Figure 1:
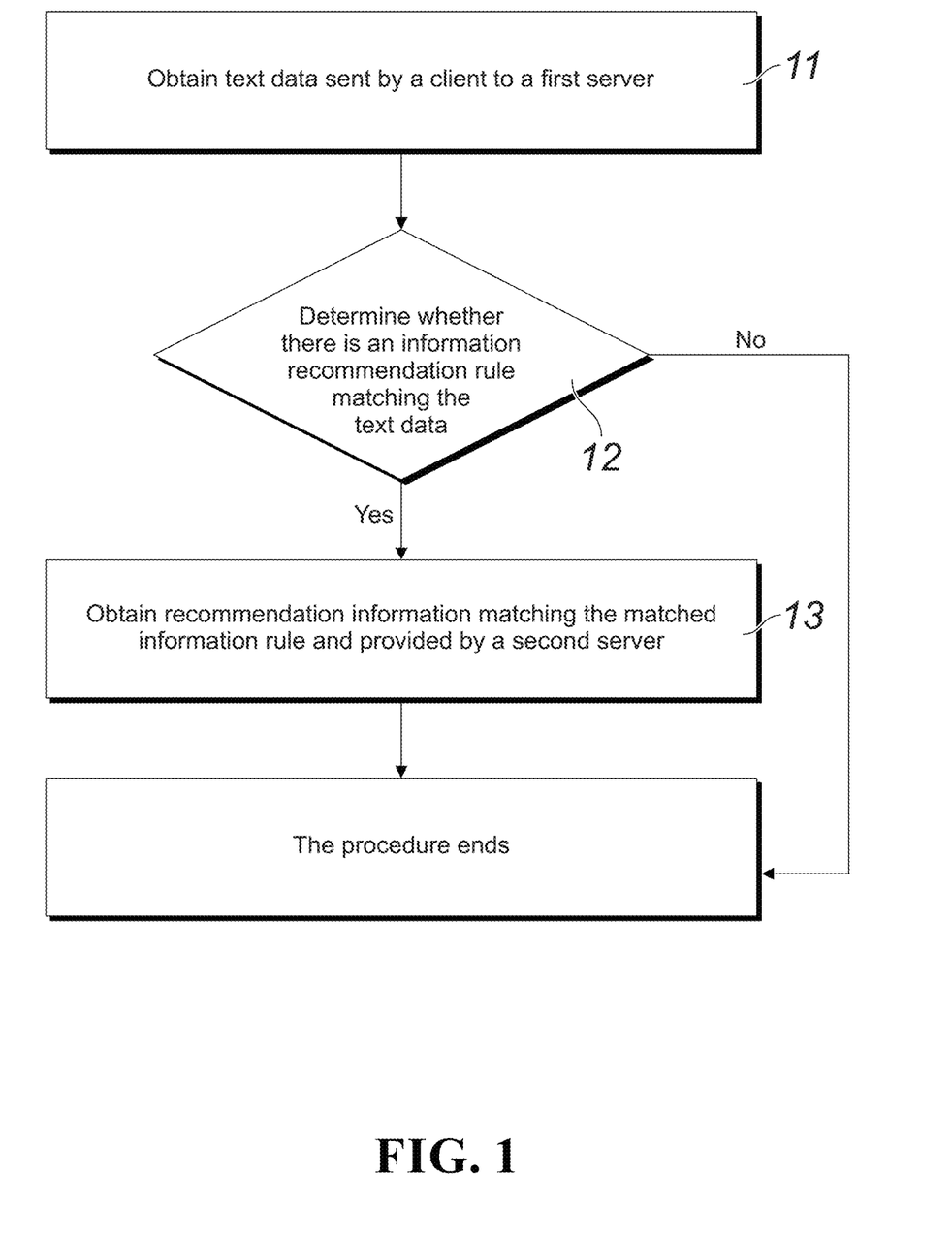
FIG. 1 is a schematic diagram illustrating a specific implementation procedure of an information recommendation method based on an implementation of the present application.

A schematic diagram illustrating a specific implementation procedure of this method is shown in FIG. 1, and the procedure mainly includes the following steps.

Step 11: The information recommendation client obtains text data sent by a client (referred to as a "data supply client" below) to a first server.

Both the information recommendation client and the data supply client in Step 11 can be any clients installed on a device such as a personal computer, a tablet computer, a smartphone, or a smart TV.

The data supply client can be the information recommendation client, or the data supply client can be another client different from the information recommendation client.

The first server is generally a back-end server of the data supply client. The first server can also be another server that can perform data transmission with the data supply client.

The text data can be, for example, a Weibo post, a log, chat content, or the like published by the data supply client. For example, assume that the data supply client is a chat application (Application, APP) installed on a mobile phone. When a user enters text content by using the chat application, they can obtain the text content (the text content is a type of text data). For another example, when a user publishes a post by using Weibo, they can obtain text content of the post.

In an implementation, a method for obtaining the text data sent by the data supply client to the first server can include, but is not limited to, the following two methods:

Method 1: The information recommendation client obtains, from the first server, the text data sent by the data supply client to the first server.

For example, assume that a user chats by using a chat application installed on a mobile phone. When the user enters chat content by using the application, and sends the chat content to a mobile phone of an information receiving party by using the first server, the first server can store the chat content. Therefore, the information recommendation client can directly send a chat content acquisition request to the first server (the request can include a chat content identifier that needs to be obtained, for example, an identifier that includes a chat content sending time and a user account), so that the first server can identify, based on the identifier, chat content needed by the user, and send text data of the chat content to the information recommendation client.

Method 2: The information recommendation client receives the text data sent by the data supply client.

For example, when the user sends text data to the first server by using the data supply client installed on the mobile phone, the data supply client can copy the text data, and send, by invoking a specified interface, the copied text data to the information recommendation client installed on the mobile phone of the user. The specified interface can be, for example, an access interface of the information recommendation client. The data supply client can have permission to invoke the specified interface.

It should be noted that, in Method 2, the text data (for example, chat content of the user) can be locally obtained from the information recommendation client without involving the first server. As such, a possible information leakage risk that is caused by obtaining text data from the server through the internet can be avoided.

It should be further noted that the text data sent by the data supply client to the first server can be obtained in the following two situations by using one of the previous two methods.

Situation 1: After a user sends text data by using a terminal, the text data sent by the user is obtained.

For example, assume that the terminal used by the user is a mobile phone, and the user uses a chat application installed on the mobile phone. If the user enters chat content by using the application, when the user taps a "send" key, text data sent by a user tapping the send key is obtained by using the previous two methods.

Situation 2: After a user enters text data by using a terminal, the text data (referred to as "text data to be sent" below) is obtained before the text data is sent.

For example, assume that the terminal used by the user is a mobile phone, and the user uses Weibo installed on the mobile phone. If the user expects to publish a post "Happy National Day and have a good time in the seven-day holiday" by using the application, when the user enters the text by using the application but does not tap a "send" key, the text entered by the user using the user terminal can also be obtained. The text is the text data to be sent.

Step 12: The information recommendation client determines whether a predetermined information recommendation rule set includes an information recommendation rule matching the text data. If the predetermined information recommendation rule set includes an information recommendation rule matching the text data, perform Step 13. Alternatively, if the predetermined information recommendation rule set does not include an information recommendation rule matching the text data, the process ends.

The information recommendation rule set includes information recommendation rules. The information recommendation rules are set based on information to be recommended, to determine whether a rule of the information to be recommended needs to be obtained.

It should be noted that the information recommendation rule set can be provided by a second server, or can be locally preset on the information recommendation client. The second server is generally a back-end server of the information recommendation client. The second server can also be another server that can perform data transmission with the information recommendation client. The information recommendation client can send a request for downloading an information recommendation rule to the second server, so that the second server sends the information recommendation rule set to the information recommendation client in response to the download request.

Generally, a subject can be set for the information to be recommended, and a key word that corresponds to the subject can be determined based on content of the information to be recommended. Correspondingly, in an implementation, a specific implementation method for setting the information recommendation rule based on the information to be recommended can include: setting the information recommendation rule to include the subject specified for the information to be recommended and the key word that corresponds to the subject; or setting the information recommendation rule to include only the key word.

In this implementation of the present application, the information recommendation rule generally can use the following two formats:

Format 1: A, A1, A2, A3, where A is the subject of the information to be recommended, and A1, A2, and A3 are key words that correspond to A.

Format 2: B1, B2, B3, where B1, B2, and B3 are key words.

For example, assuming that the information to be recommended is basketball-related, and the subject of the information to be recommended can be set to "basketball." Based on statistics, it is identified that when user's chat content includes three words: "Kobe," "Jordan," and "NBA," the user's chat content generally relates to basketball. Subsequently, a subject of an information recommendation rule related to basketball can be set to "basketball," and key words can be set to "Kobe," "Jordan," and "NBA." Therefore, the information recommendation rule can be: basketball, Kobe, Jordan, and NBA.

In this implementation of the present application, the text data matching the information recommendation rule means that the text data includes the same word as the key word in the information recommendation rule.

For example, when the text data obtained by performing step 11 includes words same as each key word in an information recommendation rule, it can be determined that the text data matches the information recommendation rule.

For example, assume that the information recommendation rule set includes an information recommendation rule that satisfies the following conditions:

1. A subject specified for the information to be recommended is: basketball.
2. Key words specified for the subject "basketball" are: "Kobe," "Jordan," and "NBA."

Therefore, when the text data sent by the data supply client to the first server is obtained by performing Step 11, and the obtained text data is "Kobe and Jordan are the two favorite NBA players of mine," because the obtained text data includes words "Kobe," "Jordan," and "NBA" that are the same as the previous key words "Kobe," "Jordan," and "NBA," it can be determined that the obtained text data complies with the specified information recommendation rule. That is, the information recommendation rule set includes an information recommendation rule matching the obtained text data.

When the text data sent by the client is obtained by performing Step 12 and is "My favorite basketball player is Kobe of the Lakers," the text data includes only a word "Kobe" matching a key word in the information recommendation rule with the subject "basketball." It can be determined that the text data does not comply with the information recommendation rule.

It should be noted that, in this implementation of the present application, a Trie can be constructed by using key words in an information recommendation rule. As such, text data can be obtained by filtering the key words in the information recommendation rule to determine whether the obtained text data includes a word matching the key word, and determine whether the text data complies with the information recommendation rule accordingly.

Figure 2:
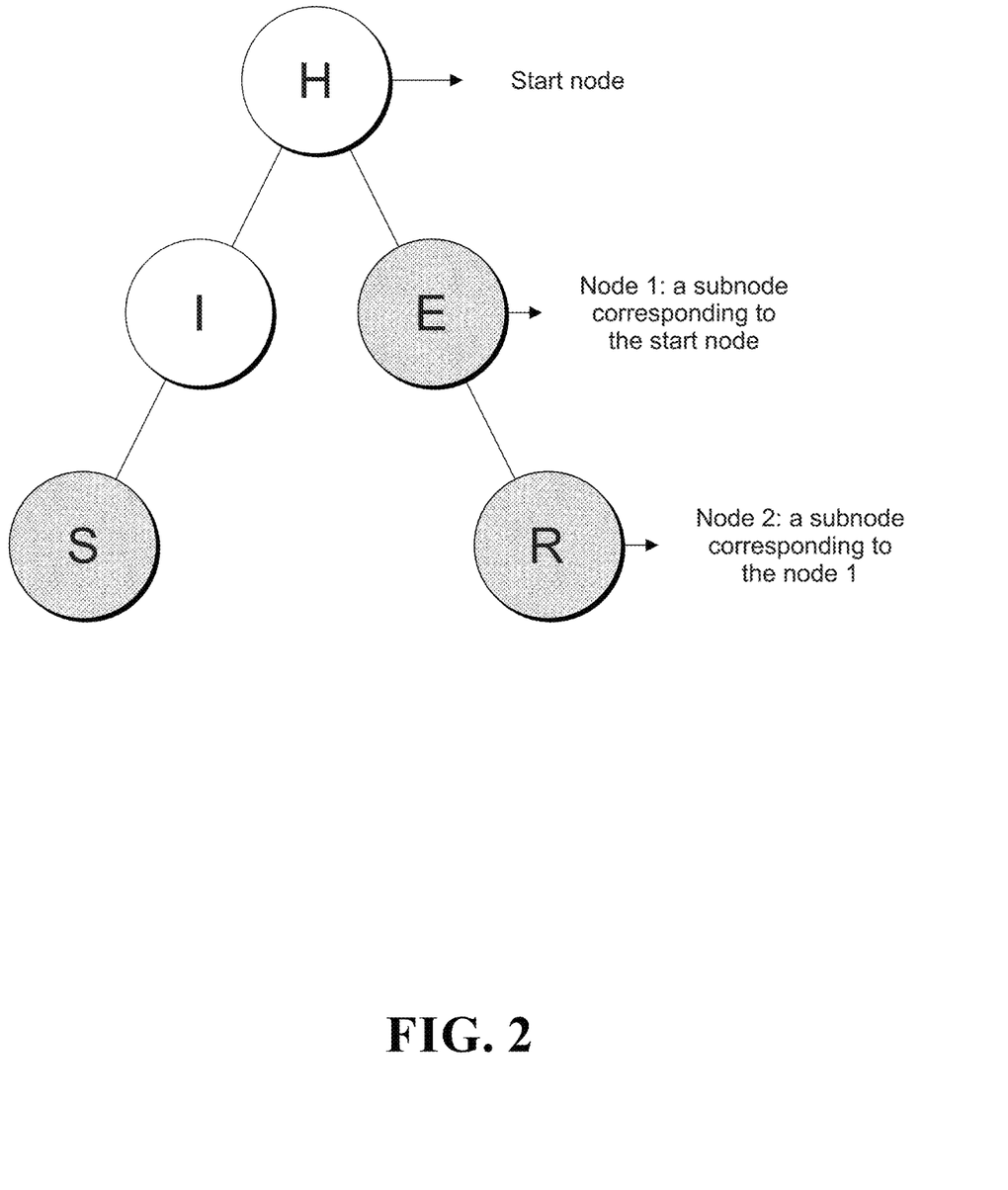
FIG. 2 is a schematic diagram illustrating a specific structure of a Trie based on an implementation of the present application.

In one implementation, a Trie can be constructed by using keywords in an information recommendation rule. Specifically, each Chinese character (or letters) that serves as the key word in the information recommendation rule can be separately allocated to each node of the Trie. Then, the node that the first Chinese character (or the first letter) in a key word is located on is set as the starting node of the Trie, and the node that the last Chinese character (or the last letter) in the key word is located on is set as the end node of the Trie. It should be noted that, when the first letter of at least two key words (or the first character of at least two keywords) in the information recommendation rule is the same, the at least two key words can be constructed in one Trie. For example, assume that key words are: "his," "he," and "her," and a Trie shown in FIG. 2 can be constructed.

Figure 3:
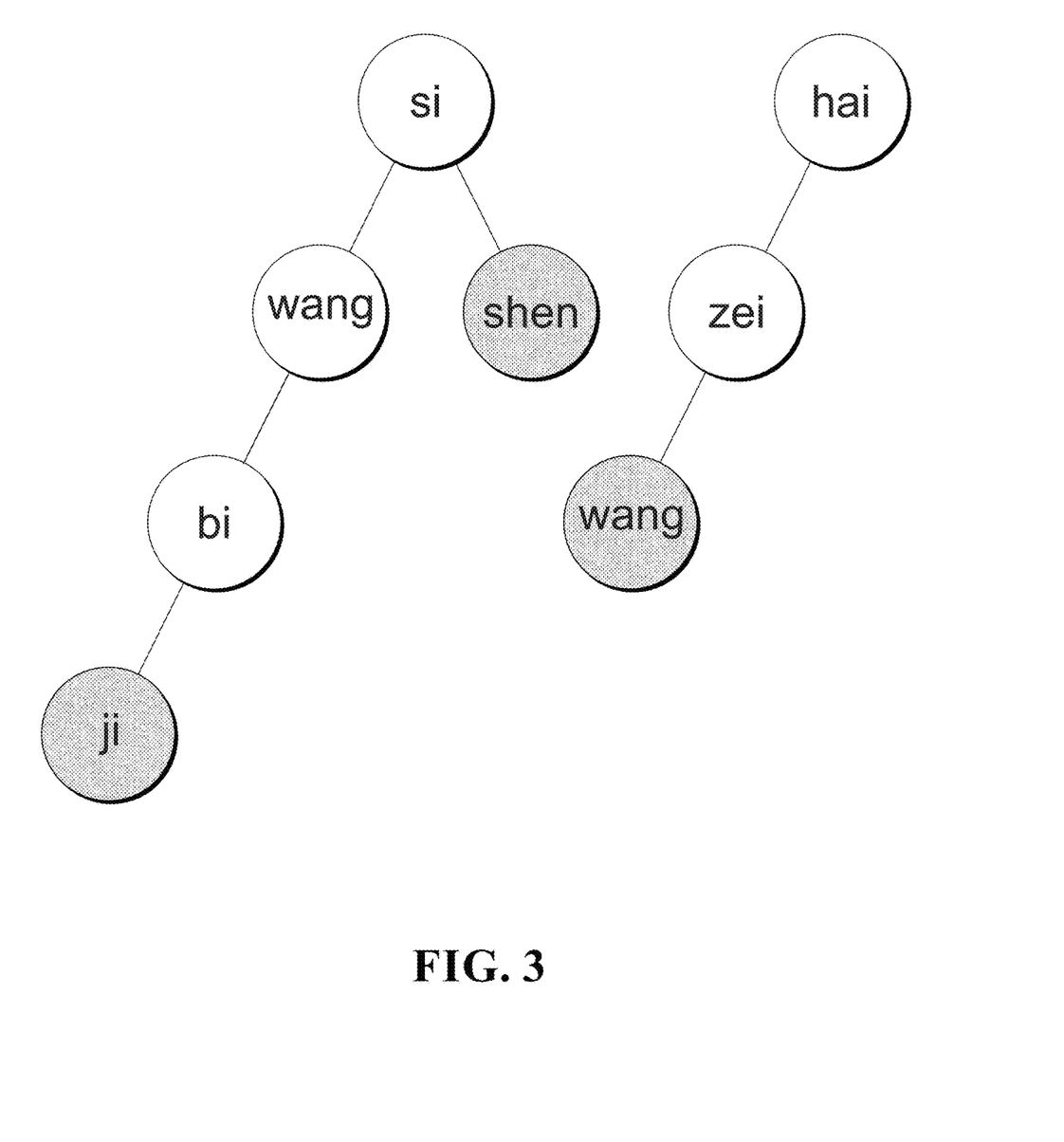
FIG. 3 is a schematic diagram illustrating a specific structure of a Trie based on an implementation of the present application.

For example, assuming that the subject of the information to be recommended is comic-related, and an information recommendation rule specific to the subject is set to: "subject: comic; key words: One Piece, Bleach, and Death Note." A Trie constructed based on the information recommendation rule is shown in FIG. 3. In FIG. 3, a deep-colored node represents an end note.

It should be noted that, assuming that the key words in the information recommendation rule are Chinese characters. A Trie constructed by the key words in the information recommendation rule is used. To determine whether in a predetermined information recommendation rule set, there is an information recommendation rule matching the text data, the process can include:

In the obtained text data, search for the Chinese character that is the same as the Chinese character allocated to the starting node of the Trie. When the Chinese character is the same as the Chinese character allocated to the start node (referred to as a "matched Chinese character" on the start node below) is retrieved, continue to obtain the Chinese character allocated to the subnode that corresponds to the starting node. Whether a Chinese character immediately following the "matched Chinese character" on the starting node is the same as the Chinese character allocated to a subnode is further examined in the text data (it should be noted that, when the same Chinese character as the Chinese character allocated to a node of the Trie is retrieved in the text data, the node is referred to as a "matched node," and the Chinese character is referred to as a "matched Chinese character"). If the Chinese character immediately following the "matched Chinese character" on the starting node is the same as the Chinese character allocated to the subnode, Chinese characters allocated to subnodes that correspond to the "matched node" are obtained continually. Whether a "matched Chinese character" that is the same as the Chinese character exists in the text data is examined based on the obtained Chinese character, and so on. The search is continued until the Chinese character that is the same as the one allocated to an end node of the Trie is retrieved in the text data, or until it is determined that the Chinese character that is the same as a Chinese character allocated to a subnode corresponding to a node matching a non-end node cannot be retrieved in the text data.

Generally, based on the foregoing method, when it is determined that Chinese characters that match Chinese characters allocated to each node of the Trie can be retrieved in the obtained text data, it indicates that the obtained text data complies with the information recommendation rule that includes the key words in the Trie.

For example, assuming that the following conditions are valid:

1. A subject of information to be recommended is "man hua" (translation: comic).
2. A specified information recommendation rule is: "subject: man hua (translation: comic); key words: hai zei wang, qi hun, si wang bi ji" (translation: One Piece, Chess Soul, Death Note), and three Tries are separately constructed based on the previous key words.
3. Text data obtained by performing Step 11 is: "wo xi huan xiao tian jian de qi hun he si wang bi ji, hai you wei tian rong yi lang de hai zei wang" (Translation: I like Takeshi Obata's Death Note, and Eiichiro Oda's One Piece).

In this case, the obtained text data is searched through the constructed Tries. Determining whether the chat text complies with the information recommendation rule can include: using a Trie constructed based on the key word "hai zei wang" to retrieve the text data, the same Chinese character can be retrieved in the text data for the character "hai" allocated to the starting node of the Trie. Further, for the character "zei" allocated to a subnode that corresponds to the starting node, the Chinese character "zei" immediately adjacent to the character "hai" can be retrieved in the text data. By analogy, the searching continues until the same Chinese character as the Chinese character "wang" allocated to the end node of the Trie is retrieved in the text data. Therefore, it is determined that the obtained text data matches the key word "hai zei wang" in the information recommendation rule.

Based on the foregoing method, the chat content is successively searched through Tries constructed by the key word "si wang bi ji" and the key word "qi hun." If the corresponding retrieval result is that the chat content matches the key words "si wang bi ji" and "qi hun" in the information recommendation rule, it can be determined that the chat content complies with the information recommendation rule.

It should be noted that different information recommendation rules can be set based on information to be recommended of the same subject. For example, consider the subject of the information to be recommended as "basketball." Based on statistics, when chat content of the user includes three words "Kobe," "Jordan," and "NBA," the chat content of the user is identified as basketball-related. If the chat content of the user includes three words "slam dunk," "block shot," and "rebound," the chat content of the user also considered basketball-related. Therefore, the following two information recommendation rules for the information to be recommended relates to "basketball" can be set:

Rule 1: subject: basketball; key words: "Kobe," "Jordan," and "NBA."
Rule 2: subject: basketball; key words: "slam dunk," "block shot," and "rebound."

It should be further noted that the same group of key words can correspond to different subjects. For example, key words "Slam Dunk" and "Kuroko's Basketball" can correspond to a subject "basketball" or a subject "comic."

Step 13: The information recommendation client obtains information to be recommended provided by a second server.

The second server here is a server that provides the information to be recommended. The second server can be the first server, or a second server different from the first server.

It should be noted that the information to be recommended can be information such as an advertisement, news, a picture, or a movie related to the subject of the information recommendation rule.

In an implementation, a method for obtaining the information to be recommended can include but is not limited to the following two methods:

Method 1: The information recommendation client triggers the second server to push the information to be recommended to the information recommendation client, and obtains the information to be recommended pushed by the second server.

For example, if the information recommendation client determines that the text data sent to the first server complies with the information recommendation rule with the subject "basketball," the information recommendation client sends an information acquisition request with the subject "basketball" to the second server. The second server receives and responds to the request, and sends, to the information recommendation client, information to be recommended that includes the subject "basketball."

For another example, the information recommendation client is installed on a mobile phone. After Step 12 is performed, if the text data sent by the data supply client complies with the information recommendation rule with the subject "basketball," the information recommendation client sends an information acquisition request with the subject "basketball" to the second server. The second server receives and responds to the request, and sends, to the mobile phone, information to be recommended that includes the subject "basketball."

It should be noted that, when the second server stores too much information to be recommended, to help the second server search for the information to be recommended, the information acquisition request can include a feature of the information to be recommended. For example, include at least one of the following features: a subject of the information to be recommended, a key word of the information to be recommended, a number of the information to be recommended, an identifier of the information recommendation rule that corresponds to the information to be recommended, and the like. That is, after receiving the information acquisition request, the second server can search for the information to be recommended based on an identifier of the information to be recommended that is included in the request.

Method 2: Download the information to be recommended from the second server.

After Step 12 is performed, if the information recommendation client determines that the text data sent to the first server complies with the information recommendation rule with the subject "basketball," the information recommendation client downloads, from the second server, information to be recommended that includes the subject "basketball."

In practical applications, different information recommendation rules may have different or the same keywords.

Generally, when same key words are set in different information recommendation rules, there can be different relevance between the key words and the information recommendation rules, that is, between the key words and information to be recommended that corresponds to the information recommendation rules. For example, the information recommendation rule 1 (including a subject "comic") and the information recommendation rule 2 (including a subject "basketball") are respectively set as the key word "Slam Dunk." Based on statistics, the relevance between the key word and the information recommendation rule 1 is usually higher than the relevance between the key word and the information recommendation rule 2. Therefore, when it is determined that the information recommendation rule set includes at least two information recommendation rules matching the text data, in order to ensure the information to be recommended obtained from the second server relatively has the highest relevance to the text data, in this implementation of the present application, a weight can be set for each key word specified in the different information recommendation rules. In this case, the information recommendation client sending an information acquisition request to the second server can include: when it is determined that there are at least two information recommendation rules matching the text data in the set, based on the weights respectively set for each key word set in the at least two information recommendation rules, selecting an information recommendation rule from the at least two information recommendation rules; including the subject set in the selected information recommendation rules in the information acquisition request, sending the information acquisition request to the second server. Subsequently, the second server can provide the information recommendation client with the information to be recommended that includes the subject based on the subject in the request.

For example, assume that the following conditions are valid:

a. A subject of information to recommend A is: basketball, and a specified information recommendation rule is: information recommendation rule 1: "subject: basketball; key word: slam dunk."
b. A subject of information to recommend B is: comic Slam Dunk, and a specified information recommendation rule is: information recommendation rule 2: "subject: comic Slam Dunk; key word: slam dunk."
c. Obtained by executing Step 11, the text data sent by the information supply client is: "The slam dunk contest yesterday was wonderful."
d. The result weight of the rule 1 is set to 2, and the result weight of the rule 2 is set to 1.
e. When the text data matches the information recommendation rule, a score of the text data=1; otherwise, a score of the text data=0.

Therefore, when it is determined based on the obtained text data that the text data matches the information recommendation rule 1, the result score of the text data sent by the information supply client is: score×weight=1×2=2 points. Similarly, if the text data matches the information recommendation rule 2, the result score of the text data is: score×weight=1×1=1 point. It can be determined based on the result score that the text data has higher relevance to the information to be recommended that includes the subject "basketball," so that the information to be recommended that includes the subject "basketball" and provided by the second server is obtained.

It should be further noted that, to avoid bringing poor user experience caused by frequently recommending information to a user, this implementation of the present application further provides a restriction policy for limiting the information recommendation client to obtain the information to be recommended from the second server. In an implementation, for Step 13 the following two policies can be used to limit the information recommendation client to obtain the information to be recommended from the second server. The two policies are as follows:

Policy a: Only when the number of words that are in the text data (usually one piece of text data) in Step 12 that are the same as key words in the information recommendation rule is not less than a predetermined number, the information recommendation client can obtain, from the second server, information to be recommended that corresponds to the information recommendation rule, and then present the information to be recommended to the user.

The information recommendation rule here can be any information recommendation rule matching the text data, or can be one information recommendation rule determined, by using the solutions described above, from at least two information recommendation rules matching the text data.

For example, assume that the following conditions are valid:

Condition 1: A subject of information to be recommended is: basketball, and a specified information recommendation rule is: information recommendation rule 1: "subject: basketball; key word: slam dunk."

Condition 2: A predetermined number is 2.

Condition 3: The obtained text data is: "I think Carter's slam dunk is the best in the slam dunk contest."

In this case, the word "slam dunk" is the same as the key word in the information recommendation rule occurs twice in the obtained text data. Therefore, the information recommendation client can obtain, from the second server, information to be recommended that includes the subject, and then present the information to be recommended to the user.

Policy b: Only when the number of pieces of text data matching a same information recommendation rule is not less than a predetermined number, the information recommendation client can obtain, from the second server, information to be recommended that corresponds to the information recommendation rule, and then present the information to be recommended to the user.

The "same information recommendation rule" here can be any information recommendation rule matching the text data in Step 12, or can be one information recommendation rule determined, by using the solutions described above, from at least two information recommendation rules matching the text data. The "text data matching a same information recommendation rule" here generally includes the text data in Step 12, and can further include other text data sent by the data supply client to the first server. The "number of pieces of text data matching a same information recommendation rule" here generally indicates the number of pieces of text data that are sent by the data supply client to the first server within a predetermined time period (for example, 30 minutes) and that match the same information recommendation rule.

For example, assume that the following conditions are valid:

Condition 1: A subject of information to be recommended is: basketball, and a specified information recommendation rule is: information recommendation rule 1: "subject: basketball; key word: slam dunk."

Condition 2: A predetermined time period is 30 minutes, and a predetermined number of pieces of data is 2.

In this case, when text data sent by the data supply client to the first server within 30 minutes and text data matching the information recommendation rule are obtained and are:

"The slam dunk contest is wonderful" and "I think Carter's slam dunk is the best," two pieces of text data in the obtained text data match the information recommendation rule. Therefore, the information recommendation client can obtain, from the second server, the information to be recommended that includes the subject, and then present the information to be recommended to the user.

It should be noted that steps in the method provided in Implementation 1 can be performed by one device, or by different devices. For example, Step 11 and Step 12 can be performed by a device 1, and Step 13 can be performed by a device 2. For another example, Step 11 can be performed by a device 1, and Step 12 and Step 13 can be performed by a device 2, etc.

Based on the information recommendation method provided in Implementation 1 of the present application, "if text data sent by the client matches an information recommendation rule specified based on information to be recommended, it indicates that the user probably belongs to a specific group of people who appreciate or are interested in the information to be recommended." Only when there is an information recommendation rule matching the text data sent by the client, the information to be recommended provided by the server can be obtained, so that selective information recommendation can be implemented on the premise that the information is recommended to the specific people, and this avoids an existing problem that many processing resources need to be consumed for recommending the information to the specific people.

Figure 4:
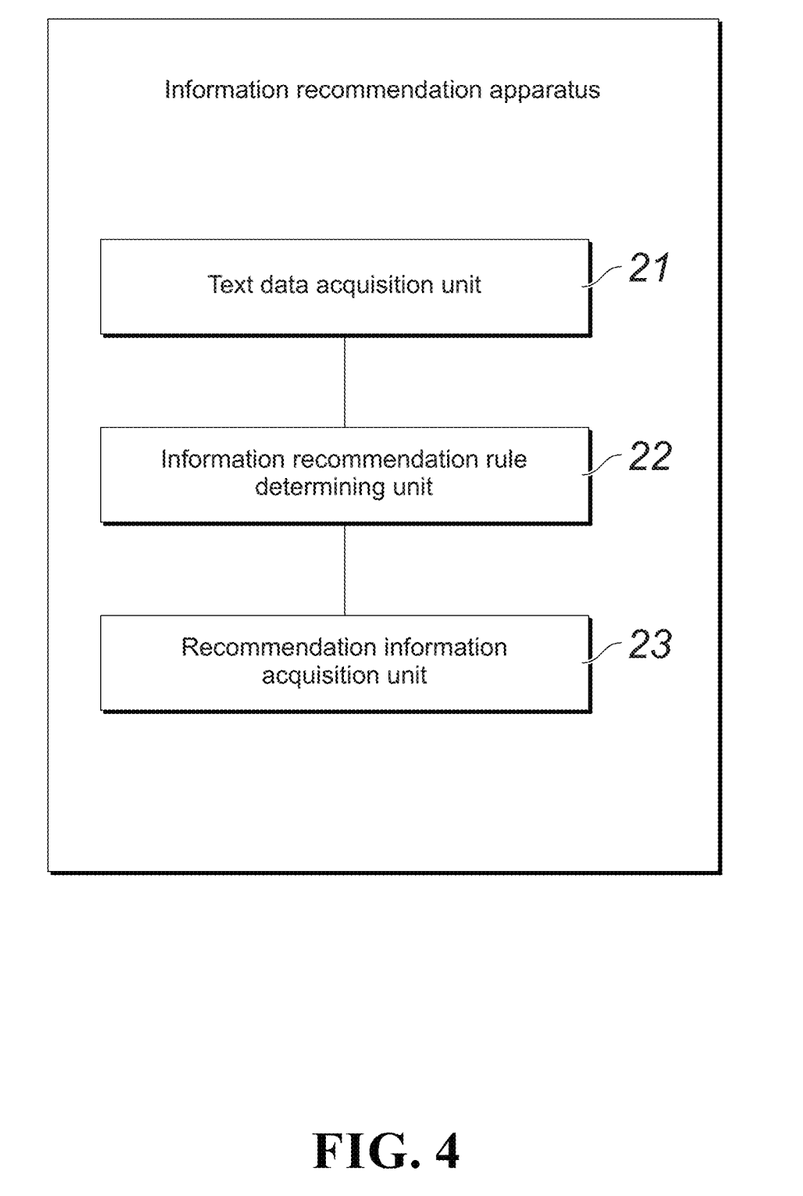
FIG. 4 is a schematic diagram illustrating a specific structure of an information recommendation apparatus based on an implementation of the present application.

In some implementations of the present application an information recommendation apparatus is provided to resolve an existing problem that many processing resources need to be consumed for recommending information to a specific group of people. A schematic diagram illustrating a specific structure of the apparatus is shown in FIG. 4, including a text data acquisition unit 21, an information recommendation rule determining unit 22, and a recommendation information acquisition unit 23.

The text data acquisition unit 21 is configured to obtain text data sent by a client to a first server.

The information recommendation rule determining unit 22 is configured to determine whether there is an information recommendation rule that matches the text data in the preset information recommendation rule set, where the set includes information recommendation rules, and the information recommendation rule is set based on information to be recommended.

The recommendation information acquisition unit 23 is configured to: determine if the predetermined information recommendation rule set includes an information recommendation rule matching the text data, and obtain recommendation information that is provided by a second server and matches the matched information rule.

In an implementation, the information to be recommended can be provided by the server. In this case, the recommendation information acquisition unit 23 is configured to: trigger the second server to push the information to be recommended, and obtain the information to be recommended pushed by the second server; or download the information to be recommended from the second server.

In an implementation, the recommendation information acquisition unit 23 is configured to: directly send an information acquisition request to the second server, and receive the information to be recommended sent by the second server in response to the information acquisition request; or trigger an information pushing application to send an information acquisition request to the second server, and receive the information to be recommended sent by the second server in response to the information acquisition request by using the information pushing application.

When the second server stores too much information to be recommended, to help the second server search for the information to be recommended, in an implementation, the information acquisition request includes a feature of the information to be recommended.

In an implementation, the feature of the information to be recommended includes at least one of the following features: a subject of the information to be recommended, a key word of the information to be recommended, a number of the information to be recommended, and an identifier of the information recommendation rule that corresponds to the information to be recommended.

In order to ensure that the information to be recommended obtained from the second server relatively has the highest relevance to the text data, in an implementation, the recommendation information acquisition unit 23 is configured to: When each information recommendation rule is set with a subject and at least one keyword corresponding to the subject, if the set includes at least two information recommendation rules matching the text data, select an information recommendation rule from the at least two information recommendation rules based on weights respectively set for key words in the at least two information recommendation rules; and add a subject specified in the selected information recommendation rule to the information acquisition request, and send the information acquisition request to the second server.

The text data can be actively obtained, or can be passively received. For example, in an implementation, the text data acquisition unit 21 can be configured to: obtain, from the first server, the text data sent by the client to the first server; or receive text data sent by the client, where the text data sent by the client is obtained by copying the text data sent by the client to the first server.

In order to identify the predetermined information recommendation rule set more effectively and quickly, to determine whether the predetermined information recommendation rule set includes an information recommendation rule matching the text data, in an implementation, the information recommendation rule determining unit is further configured to: before determining whether the set includes an information recommendation rule matching the text data, obtain and save a set provided by the second server.

Based on the information recommendation apparatus provided in Implementation 2 of the present application, "if text data sent by the client matches an information recommendation rule specified based on information to be recommended, it indicates that a user probably belongs to a specific group of people who appreciate or are interested in the information to be recommended." Only when there is an information recommendation rule matching the text data sent by the client, the information to be recommended provided by the server can be obtained, so that selective information recommendation can be implemented on the premise that the information is recommended to the specific people, and this avoids an existing problem that many processing resources need to be consumed for recommending the information to the specific people.

A person skilled in the art should understand that the implementations of the present disclosure can be provided as a method, a system, or a computer program product. Therefore, the present disclosure can use a form of hardware only implementations, software only implementations, or implementations with a combination of software and hardware.

Moreover, the present disclosure can use a form of a computer program product implemented on one or more computer-usable storage media (including but not limited to a magnetic disk memory, a CD-ROM, an optical memory, and the like) that include computer-usable program code.

The present disclosure is described with reference to the flowcharts and/or block diagrams of the method, the device (system), and the computer program product based on the implementations of the present disclosure. It should be understood that computer program instructions can be used to implement each process and/or each block in the flowcharts and/or the block diagrams and a combination of a process and/or a block in the flowcharts and/or the block diagrams. These computer program instructions can be provided for a general-purpose computer, a dedicated computer, an embedded processor, or a processor of any other programmable data processing device to generate a machine, so that the instructions executed by a computer or a processor of any other programmable data processing device generate an apparatus for implementing a specified function in one or more processes in the flowcharts and/or in one or more blocks in the block diagrams.

These computer program instructions can be stored in a computer-readable memory that can instruct the computer or any other programmable data processing device to work in a specific way, so that the instructions stored in the computer-readable memory can generate an artifact that includes an instruction apparatus. The instruction apparatus implements a specified function in one or more processes in the flowcharts and/or in one or more blocks in the block diagrams.

These computer program instructions can be loaded to a computer or another programmable data processing device, so that a series of operations and steps are performed on the computer or the another programmable device, thereby generating computer-implemented processing. Therefore, the instructions executed on the computer or the another programmable device provide steps for implementing a specific function in one or more procedures in the flowcharts and/or in one or more blocks in the block diagrams.

In a typical configuration, a computing device includes one or more processors (CPU), an input/output interface, a network interface, and a memory.

The memory can include a non-persistent memory, a random access memory (RAM), a non-volatile memory, and/or another form that are/is in a computer-readable medium, for example, a read-only memory (ROM) or a flash memory (flash memory). The memory is an example of the computer-readable medium.

The computer-readable medium includes persistent, non-persistent, movable, and unmovable media that can store information by using any method or technology. The information can be a computer-readable instruction, a data structure, a program module, or other data. Examples of a computer storage medium include but are not limited to: a phase change memory (PRAM), a static random access memory (SRAM), a dynamic random access memory (DRAM) or another type of random access memory (RAM), a read-only memory (ROM), an electrically erasable programmable read-only memory (EEPROM), a flash memory or another memory technology, a compact disc read-only memory (CD-ROM), a digital versatile disc (DVD) or another optical storage, a magnetic cassette, a magnetic tape, a magnetic tape/magnetic disk memory or another magnetic storage device, or any other non-transmission medium that can be used to store information that can be accessed by a computing device. As defined in this specification, the computer readable medium does not include computer-readable transitory media (transitory media) such as a modulated data signal and a carrier.

It should be further noted that, the term "include," "contain," or their any other variant is intended to cover a non-exclusive inclusion, so that a process, a method, a commodity, or a device that includes a series of elements not only includes those elements but also includes other elements that are not expressly listed, or further includes elements inherent to such process, method, commodity, or device. An element described by "includes a . . . " further includes, without more constraints, another identical element in the process, method, commodity, or device that includes the element.

A person skilled in the art should understand that the implementations of the present application can be provided as a method, a system, or a computer program product. Therefore, the present application can use a form of hardware only implementations, software only implementations, or implementations with a combination of software and hardware. Moreover, the present application can use a form of a computer program product implemented on one or more computer-usable storage media (including but not limited to a magnetic disk memory, a CD-ROM, an optical memory, and the like) that include computer-usable program code.

The previous descriptions are merely implementations of the present application, and are not intended to limit the present application. A person skilled in the art can make various modifications and changes to the present application. Any modification, equivalent replacement, or improvement made within the spirit and principle of the present application shall fall within the scope of the claims in the present application.

Figure 5:
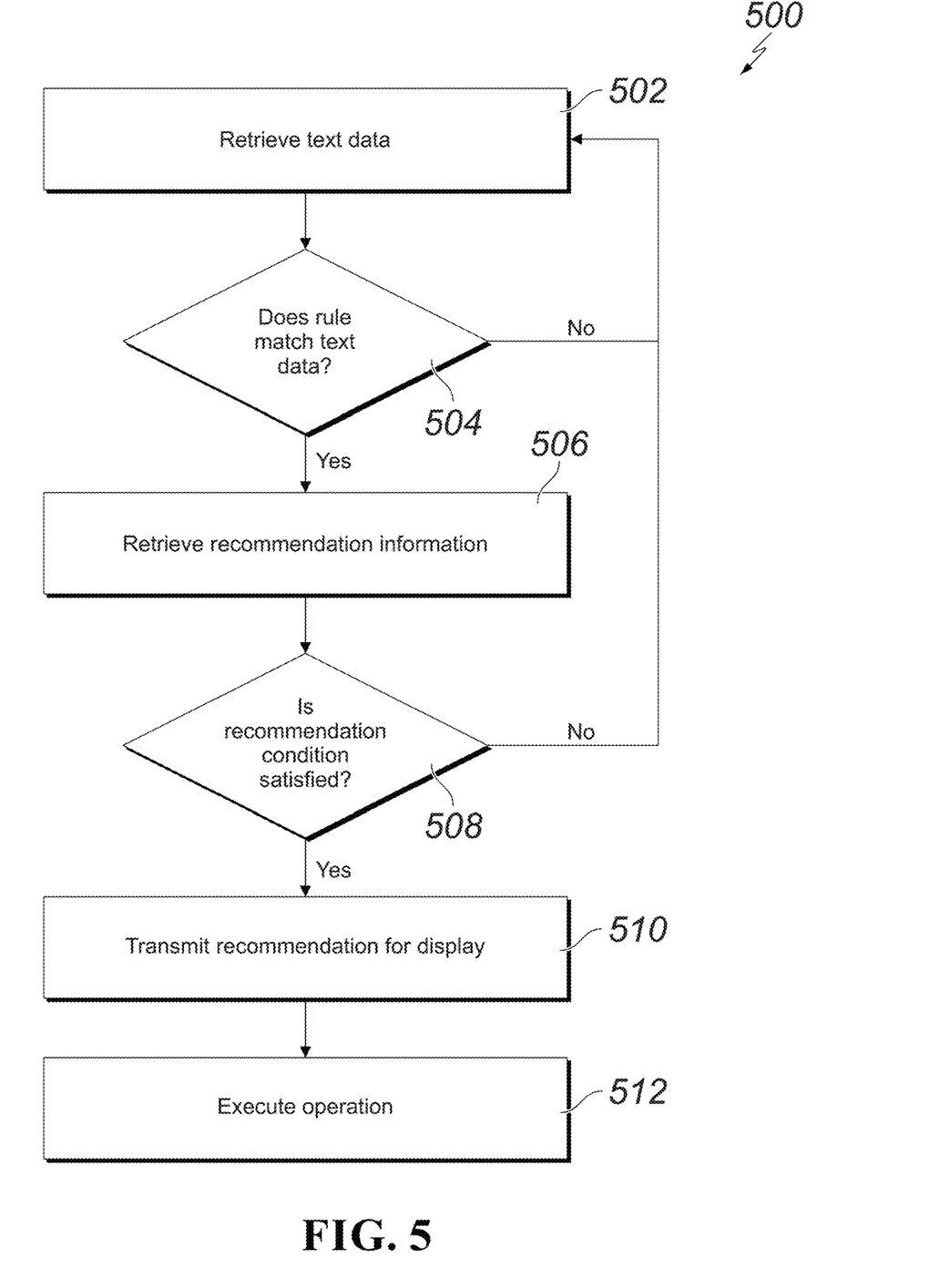
FIG. 5 is a flowchart illustrating an example of a computer-implemented method for generating recommendations, according to an implementation of the present disclosure.

FIG. 5 is a flowchart illustrating an example of a computer-implemented method 500 for generating a recommendation, according to an implementation of the present disclosure. For clarity of presentation, the description that follows generally describes method 500 in the context of the other figures in this description. However, it will be understood that method 500 can be performed, for example, by any system, environment, software, and hardware, or a combination of systems, environments, software, and hardware, as appropriate. In some implementations, various steps of method 500 can be run in parallel, in combination, in loops, or in any order.

At 502, text data is transmitted by a user device to a first server. The text data can include a text entered by a user within an application hosted by the first server and running on the user device, such as a message to be posted within a social network. In some implementations, the text data is automatically transmitted by the user device to the first server before a user input selects a transmission (posting) of the text data. In some implementations, the text data includes a plurality of key words and a subject. The key words can be nouns (for example, names of items, persons, sport teams, places, and brands) reflecting the interests of the user. The subject can be statistically determined based on the plurality of key words. The subject can be a category that matches all or a portion of the key words.

In some implementations, the text data is stored by the user device or the first server. In some implementations, the text data transmitted by the user device is obtained by copying the text data transmitted by the user device to the first server. For example, a user chats by using a chat application installed on a mobile phone. When the user enters chat content by using the application, and sends the chat content to a mobile phone of an information receiving party by using the first server, the first server can store the chat content. An information recommendation system can send a chat content acquisition request to the first server. The request can include an identifier associated to the text data to be obtained. For example, the identifier includes a content sending time and a user account. The first server can identify, based on the identifier, the text data (chat content) associated with the user, and send the text data to the information recommendation system. From 502, method 500 proceeds to 504.

At 504, the text data is processed to determine whether an information recommendation rule set includes an information recommendation rule matching the text data. In some implementations, the information recommendation rule set is based on a recommendation information. In some implementations, the information recommendation rule set is stored at the first server or at a second server. In some implementations, matching the text data includes searching the plurality of key words of the text data in a hierarchical data structure corresponding to the subject of the text data. The hierarchical data structure can include a Trie, associated to the information recommendation rule. A Trie can be constructed by using keywords in an information recommendation rule. Specifically, each phonetic or word symbol (for example, Chinese character) or letters (for example, Latin, Greek, Cyrillic letters) of a word that serves as the key word in the information recommendation rule can be separately allocated to each node of the Trie. The node that the first Chinese character (or the first letter) in a key word is located on is set as the starting node of the Trie, and the node that the last Chinese character (or the last letter) in the key word is located on is set as the end node of the Trie. If the first letter of at least two key words (or the first character of at least two keywords) in the information recommendation rule is the same, the at least two key words can be constructed in one Trie. The result of traversing the Trie includes a set of matched nodes. The set of matched nodes can be a void data set if the text data does not match the information recommendation rule or can include one or more matched nodes for each key word of the text data matching a key word included in the Trie. In response to determining that the text data does not match the information recommendation rule from 504, method 500 returns to 502. In response to determining that the information recommendation rule set includes the information recommendation rule matching the text data, from 504, method 500 proceeds to 506.

At 506, the recommendation information is retrieved from a second server. Retrieving the information can include triggering the second server to push the recommendation information, and retrieving the recommendation information pushed by the second server. For example, an information acquisition request is transmitted to the second server. The recommendation information transmitted by the second server is received in response to the information acquisition request. In some implementations, the information acquisition request includes a feature of the recommendation information. The feature of the recommendation information can include at least one of: a subject of the recommendation information, a key word of the recommendation information, a number of the recommendation information, and an identifier of the information recommendation rule that corresponds to the recommendation information. In some implementations, the subject and the key word are set for each information recommendation rule in the information recommendation rule set. In some implementations, it is determined whether the information recommendation rule set includes at least two information recommendation rules matching the text data. In response to determining that the information recommendation rule set includes at least two information recommendation rules matching the text data, the information recommendation rule is selected from the at least two information recommendation rules based on weights associated to key words included in the at least two information recommendation rules. A subject can be specified in the selected information recommendation rule to the information acquisition request. The information acquisition request can be transmitted to the second server. An information pushing application can be triggered to end an information acquisition request to the second server. In some implementations, the recommendation information transmitted by the second server in response to the information acquisition request can be received by the information pushing application. In some implementations, the recommendation information can be downloaded from the second server. From 506, method 500 proceeds to 508.

At 508, a recommendation condition is verified. The recommendation condition can include a comparison to one or more recommendation condition metrics. The recommendation condition metrics can include a threshold number of matched nodes, a time period during which the text data was collected and analyzed and a number of times a similar recommendation information was used to generate a recommendation within a particular time period. For example, the recommendation condition can define that a recommendation can be generated if the number of matched nodes exceeds the threshold number of matched nodes for a text that was generated within a first time frame (for example, last 30 minutes) and no similar recommendation was generated within a second time frame (for example, last 2 days). In some implementations, the recommendation condition (for example, threshold number) is selected based on computational resources to save network resources, and minimize computational costs of the server. In response to determining that the recommendation condition is not satisfied, from 508, method 500 returns to 502. In response to determining that the recommendation condition is satisfied, from 508, method 500 proceeds to 510.

At 510, a recommendation is transmitted to the user device for display. The recommendation is based on the recommendation information. For example, the recommendation includes advertisement, news, a picture, and a movie associated to the information recommendation rule. In some implementations, a most accurate recommendation is selected from a set of possible recommendations for transmission. In some implementations, the most accurate recommendation is selected based on a user profile (for example, preferences or statistical ranking of past responses to different types of recommendations). The recommendation can be automatically displayed within an application associated to the recommendation (for example, a graphical user interface of a browser). From 510, method 500 proceeds to 512.

At 512, an operation associated to the recommendation (for example, a purchasing order) is initiated or executed by the server, skipping at least one operation (for example, search) based on a user input to minimize the time required to complete the operation associated to the recommendation by saving computing resources. After 512, method 500 stops.

Embodiments and the operations described in this specification can be implemented in digital electronic circuitry, or in computer software, firmware, or hardware, including the structures disclosed in this specification or in combinations of one or more of them. The operations can be implemented as operations performed by a data processing apparatus on data stored on one or more computer-readable storage devices or received from other sources. A data processing apparatus, computer, or computing device may encompass apparatus, devices, and machines for processing data, including by way of example a programmable processor, a computer, a system on a chip, or multiple ones, or combinations, of the foregoing. The apparatus can include special purpose logic circuitry, for example, a central processing unit (CPU), a field programmable gate array (FPGA) or an application-specific integrated circuit (ASIC). The apparatus can also include code that creates an execution environment for the computer program in question, for example, code that constitutes processor firmware, a protocol stack, a database management system, an operating system (for example an operating system or a combination of operating systems), a cross-platform runtime environment, a virtual machine, or a combination of one or more of them. The apparatus and execution environment can realize various different computing model infrastructures, such as web services, distributed computing and grid computing infrastructures.

A computer program (also known, for example, as a program, software, software application, software module, software unit, script, or code) can be written in any form of programming language, including compiled or interpreted languages, declarative or procedural languages, and it can be deployed in any form, including as a stand-alone program or as a module, component, subroutine, object, or other unit suitable for use in a computing environment. A program can be stored in a portion of a file that holds other programs or data (for example, one or more scripts stored in a markup language document), in a single file dedicated to the program in question, or in multiple coordinated files (for example, files that store one or more modules, sub-programs, or portions of code). A computer program can be executed on one computer or on multiple computers that are located at one site or distributed across multiple sites and interconnected by a communication network.

Processors for execution of a computer program include, by way of example, both general- and special-purpose microprocessors, and any one or more processors of any kind of digital computer. Generally, a processor will receive instructions and data from a read-only memory or a random-access memory or both. The essential elements of a computer are a processor for performing actions in accordance with instructions and one or more memory devices for storing instructions and data. Generally, a computer will also include, or be operatively coupled to receive data from or transfer data to, or both, one or more mass storage devices for storing data. A computer can be embedded in another device, for example, a mobile device, a personal digital assistant (PDA), a game console, a Global Positioning System (GPS) receiver, or a portable storage device. Devices suitable for storing computer program instructions and data include non-volatile memory, media and memory devices, including, by way of example, semiconductor memory devices, magnetic disks, and magneto-optical disks. The processor and the memory can be supplemented by, or incorporated in, special-purpose logic circuitry.

Mobile devices can include handsets, user equipment (UE), mobile telephones (for example, smartphones), tablets, wearable devices (for example, smart watches and smart eyeglasses), implanted devices within the human body (for example, biosensors, cochlear implants), or other types of mobile devices. The mobile devices can communicate wirelessly (for example, using radio frequency (RF) signals) to various communication networks (described below). The mobile devices can include sensors for determining characteristics of the mobile device's current environment. The sensors can include cameras, microphones, proximity sensors, GPS sensors, motion sensors, accelerometers, ambient light sensors, moisture sensors, gyroscopes, compasses, barometers, fingerprint sensors, facial recognition systems, RF sensors (for example, Wi-Fi and cellular radios), thermal sensors, or other types of sensors. For example, the cameras can include a forward- or rear-facing camera with movable or fixed lenses, a flash, an image sensor, and an image processor. The camera can be a megapixel camera capable of capturing details for facial and/or iris recognition. The camera along with a data processor and authentication information stored in memory or accessed remotely can form a facial recognition system. The facial recognition system or one-or-more sensors, for example, microphones, motion sensors, accelerometers, GPS sensors, or RF sensors, can be used for user authentication.

To provide for interaction with a user, embodiments can be implemented on a computer having a display device and an input device, for example, a liquid crystal display (LCD) or organic light-emitting diode (OLED)/virtual-reality (VR)/augmented-reality (AR) display for displaying information to the user and a touchscreen, keyboard, and a pointing device by which the user can provide input to the computer. Other kinds of devices can be used to provide for interaction with a user as well; for example, feedback provided to the user can be any form of sensory feedback, for example, visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser.

Embodiments can be implemented using computing devices interconnected by any form or medium of wireline or wireless digital data communication (or combination thereof), for example, a communication network. Examples of interconnected devices are a client and a server generally remote from each other that typically interact through a communication network. A client, for example, a mobile device, can carry out transactions itself, with a server, or through a server, for example, performing buy, sell, pay, give, send, or loan transactions, or authorizing the same. Such transactions may be in real time such that an action and a response are temporally proximate; for example an individual perceives the action and the response occurring substantially simultaneously, the time difference for a response following the individual's action is less than 1 millisecond (ms) or less than 1 second (s), or the response is without intentional delay taking into account processing limitations of the system.

Examples of communication networks include a local area network (LAN), a radio access network (RAN), a metropolitan area network (MAN), and a wide area network (WAN). The communication network can include all or a portion of the Internet, another communication network, or a combination of communication networks. Information can be transmitted on the communication network according to various protocols and standards, including Long Term Evolution (LTE), 5G, IEEE 802, Internet Protocol (IP), or other protocols or combinations of protocols. The communication network can transmit voice, video, biometric, or authentication data, or other information between the connected computing devices.

Features described as separate implementations may be implemented, in combination, in a single implementation, while features described as a single implementation may be implemented in multiple implementations, separately, or in any suitable sub-combination. Operations described and claimed in a particular order should not be understood as requiring that the particular order, nor that all illustrated operations must be performed (some operations can be optional). As appropriate, multitasking or parallel-processing (or a combination of multitasking and parallel-processing) can be performed.

What is claimed is:

1. A computer-implemented method comprising:
retrieving, by one or more processors of an information recommendation client and from a data supply client, text data provided as text input in a graphical user interface of the data supply client, the text data comprising a message to be posted within a social network and being retrieved by the data supply client before receiving a user input that is configured to transmit the text data to the social network, and wherein the text data is prefiltered based on a feature of a recommendation information;
processing, by the one or more processors of the information recommendation client, the text data to determine a plurality of keywords and a subject;
retrieving, by the one or more processors of the information recommendation client, an information recommendation rule set corresponding to the subject;
determining, by the one or more processors of the information recommendation client, that the information recommendation rule set comprises an information recommendation rule matching the plurality of keywords and the subject of the text data, wherein matching the text data comprises searching the plurality of keywords in a trie associated to the information recommendation rule and generating a set of matched nodes;
in response to determining that the information recommendation rule set comprises the information recommendation rule matching the text data, retrieving, by the one or more processors of the information recommendation client, the recommendation information from a server;
transmitting, by the one or more processors of the information recommendation client, a recommendation based on the recommendation information to the graphical user interface of the data supply client; and
displaying, by the graphical user interface of the data supply client, the recommendation within the social network.

2. The computer-implemented method of claim 1, wherein retrieving the recommendation information from the server comprises one of:
triggering the server to push the recommendation information, and retrieving the recommendation information pushed by the server; and
downloading the recommendation information from the server.

3. The computer-implemented method of claim 2, wherein triggering the server to push the recommendation information comprises at least one of:
transmitting an information acquisition request to the server, and receiving the recommendation information transmitted by the server in response to the information acquisition request; and
triggering an information pushing application to send the information acquisition request to the server, and receiving the recommendation information transmitted by the server in response to the information acquisition request by using the information pushing application.

4. The computer-implemented method of claim 3, wherein the information acquisition request comprises a feature of the recommendation information.

5. The computer-implemented method of claim 4, wherein the feature of the recommendation information comprises at least one of:
a number of the recommendation information; and
an identifier of the information recommendation rule that corresponds to the recommendation information.

6. The computer-implemented method of claim 5, wherein the subject and the plurality of keywords are set for each information recommendation rule in the information recommendation rule set.

7. The computer-implemented method of claim 6, wherein transmitting the information acquisition request to the server comprises:
determining whether the information recommendation rule set comprises at least two information recommendation rules matching the text data;
in response to determining that the information recommendation rule set comprises at least two information recommendation rules matching the text data, selecting the information recommendation rule from the at least two information recommendation rules based on weights associated to keywords included in the at least two information recommendation rules;
adding a subject specified in the selected information recommendation rule to the information acquisition request; and
transmitting the information acquisition request to the server.

8. The computer-implemented method of claim 1, further comprising:
receiving the text data transmitted by the data supply client, wherein the text data transmitted by the data supply client is obtained by copying the text data transmitted by the data supply client to a server.

9. The computer-implemented method of claim 8, further comprising storing the information recommendation rule set at the server.

10. The computer-implemented method of claim 8, wherein the text data is automatically transmitted by the data supply client to the first server before a user input selecting a transmission of the text data is received.

11. The computer-implemented method of claim 1, wherein the subject that is statistically determined based on a correspondence between the plurality of keywords and the subject.

12. The computer-implemented method of claim 1, further comprising comparing the set of matched nodes to a threshold number of matched nodes and in response to exceeding the threshold number of matched nodes transmitting the recommendation to the data supply client.

13. The computer-implemented method of claim 1, wherein the recommendation comprises at least one of an advertisement, news, a picture, and a movie associated to the information recommendation rule.

14. A non-transitory, computer-readable storage media storing one or more instructions executable by a computer system to perform operations comprising:
retrieving, by one or more processors of an information recommendation client and from a data supply client, text data provided as text input in a graphical user interface of the data supply client, the text data comprising a message to be posted within a social network and being retrieved by the data supply client before receiving a user input that selects a transmission of the text data to the social network, and wherein the text data is prefiltered based on a feature of a recommendation information;

processing, by the one or more processors of the information recommendation client, the text data to determine a plurality of keywords and a subject;

retrieving, by the one or more processors of the information recommendation client, an information recommendation rule set corresponding to the subject, wherein the information recommendation rule set-is preset on the information recommendation client;

determining, by the one or more processors of the information recommendation client, that the information recommendation rule set comprises an information recommendation rule matching the plurality of keywords and the subject of the text data, wherein matching the text data comprises searching the plurality of keywords in a trie associated to the information recommendation rule and generating a set of matched nodes;

in response to determining that the information recommendation rule set comprises the information recommendation rule matching the text data, retrieving, by the one or more processors of the information recommendation client, the recommendation information from a server;

transmitting, by the one or more processors of the information recommendation client, a recommendation based on the recommendation information to the graphical user interface of the data supply client; and displaying, by the graphical user interface of the data supply client, the recommendation within the social network.

15. The non-transitory, computer-readable storage media of claim 14, wherein retrieving the recommendation information from the server comprises one of:

triggering the server to push the recommendation information, and retrieving the recommendation information pushed by the server; and downloading the recommendation information from the server.

16. The non-transitory, computer-readable storage media of claim 15, wherein triggering the server to push the recommendation information comprises at least one of:

transmitting an information acquisition request to the server, and receiving the recommendation information transmitted by the server in response to the information acquisition request; and triggering an information pushing application to send an information acquisition request to the server, and receiving the recommendation information transmitted by the server in response to the information acquisition request by using the information pushing application.

17. A computer-implemented system, comprising:

one or more computers; and one or more computer memory devices interoperably coupled with the one or more computers and having tangible, non-transitory, machine-readable media storing one or more instructions that, when executed by the one or more computers, perform one or more operations comprising:

retrieving, by one or more processors of an information recommendation client and from a data supply client, text data provided as text input in a graphical user interface of the data supply client, the text data comprising a message to be posted within a social network and being retrieved by the data supply client before receiving a user input that selects a transmission of the text data to the social network, and wherein the text data is prefiltered based on a feature of a recommendation information, processing, by the one or more processors of the information recommendation client, the text data to determine a plurality of keywords and a subject, retrieving, by the one or more processors of the information recommendation client, an information recommendation rule set corresponding to the subject, wherein the information recommendation rule set-is preset on the information recommendation client, determining, by the one or more processors of the information recommendation client, that the information recommendation rule set comprises an information recommendation rule matching the plurality of keywords and the subject of the text data, wherein matching the text data comprises searching the plurality of keywords in a trie associated to the information recommendation rule and generating a set of matched nodes, in response to determining that the information recommendation rule set comprises the information recommendation rule matching the text data, retrieving, by the one or more processors of the information recommendation client, the recommendation information from a server, transmitting, by the one or more processors of the information recommendation client, a recommendation based on the recommendation information to the graphical user interface of the data supply client, and displaying, by the graphical user interface of the data supply client, the recommendation within the social network.

18. The computer-implemented system of claim 17, wherein retrieving the recommendation information from the server comprises one of:

triggering the server to push the recommendation information, and retrieving the recommendation information pushed by the server; and downloading the recommendation information from the server.

19. The computer-implemented system of claim 18, wherein triggering the server to push the recommendation information comprises at least one of:

transmitting an information acquisition request to the server, and receiving the recommendation information transmitted by the server in response to the information acquisition request; and triggering an information pushing application to send an information acquisition request to the server, and receiving the recommendation information transmitted by the server in response to the information acquisition request by using the information pushing application.

* * * * *

UNITED STATES PATENT AND TRADEMARK OFFICE
CERTIFICATE OF CORRECTION

PATENT NO. : 11,113,743 B2
APPLICATION NO. : 16/722202
DATED : September 7, 2021
INVENTOR(S) : Wang et al.

Page 1 of 1

It is certified that error appears in the above-identified patent and that said Letters Patent is hereby corrected as shown below:

In the Claims

Column 20, Line 48, in Claim 10, before "server" delete "first".

Column 21, Line 5, in Claim 14, delete "selects a transmission of" and insert -- is configured to transmit --, therefor.

Column 21, Lines 15-17, in Claim 14, delete ", wherein the information recommendation rule set-is present on the information recommendation client".

Column 22, Lines 10-11, in Claim 17, delete "selects a transmission of" and insert -- is configured to transmit --, therefor.

Column 22, Line 19, in Claim 17, delete "set-is" and insert -- set is --, therefor.

Signed and Sealed this
Seventh Day of December, 2021

Drew Hirshfeld
*Performing the Functions and Duties of the*
*Under Secretary of Commerce for Intellectual Property and*
*Director of the United States Patent and Trademark Office*